United States Patent

Kelly et al.

Patent Number: 5,239,467
Date of Patent: Aug. 24, 1993

[54] METHOD FOR ENHANCING GEOPHYSICAL DATA BY NONLINEAR COMPRESSION OF THE DYNAMIC RANGE

[75] Inventors: Michael C. Kelly, Sand Springs, Okla.; Jean M. Rickert, Houston, Tex.

[73] Assignee: Amoco Corporation, Chicago, Ill.

[21] Appl. No.: 839,739

[22] Filed: Feb. 19, 1992

Related U.S. Application Data

[63] Continuation of Ser. No. 526,360, May 21, 1990, abandoned.

[51] Int. Cl.$^5$ .......................... G06F 15/36; G01V 1/34
[52] U.S. Cl. ...................................... 364/421; 367/69; 367/70
[58] Field of Search .................. 364/420, 421; 367/43, 367/48, 67, 68, 69, 70, 71; 358/41, 43

[56] References Cited

U.S. PATENT DOCUMENTS

| | | | |
|---|---|---|---|
| 3,665,402 | 5/1987 | Young | 342/91 |
| 4,278,964 | 7/1981 | Vanderford | 340/347 DA |
| 4,458,341 | 7/1984 | Goebel | 367/43 |
| 4,551,816 | 11/1985 | Hyatt | 364/728.03 |
| 4,646,275 | 2/1987 | Smith | 367/67 |
| 4,945,519 | 7/1990 | Stanley | 367/48 |

Primary Examiner—Robert A. Weinhardt
Assistant Examiner—Andrew Bodendorf
Attorney, Agent, or Firm—James A. Gabala; Richard A. Kretchmer; Frank J. Sroka

[57] ABSTRACT

The present invention provides an improved method of processing and displaying geophysical data so as to enhance the evaluation and interpretation of subtle variations in the earth's geological and lithological structures. In particular, the dynamic range of geophysical data is compressed to more nearly approximate the inherent dynamic range limitations of visual displays of the geophysical data.

12 Claims, 7 Drawing Sheets

METHOD FOR ENHANCING GEOPHYSICAL DATA BY NONLINEAR COMPRESSION OF THE DYNAMIC RANGE

This is a continuation of copending application Ser. No. 526,360 filed May 21, 1990 now abandoned.

BACKGROUND OF THE INVENTION

The present invention relates generally to the field of geophysical exploration and more particularly to an improvement in processing and displaying geophysical data so as to enhance the evaluation and interpretation of subtle variations in the earth's geological and lithological structures.

As geophysical data acquisition and processing techniques have advanced, the dynamic range of geophysical data has increased from about 12–18 db to as high as 132 db. However, conventional black-and-white wiggle trace plots of such geophysical data have only a dynamic range display capability of approximately 12 to 18 db. While the application of color to the display of geophysical data can increase the displayed dynamic range somewhat, the non-noise corrupted signal contained in present day geophysical data still has substantially greater dynamic range than current display techniques can portray.

In view of the increased information contained in present day geophysical data, a novel method of processing and displaying geophysical data has been developed. In particular, the present invention provides a method for compressing the dynamic range of seismic data so that the compressed seismic data can be displayed on dynamic range limited seismic plots so as to portray more of the dynamic range of the seismic data and thus enhance the geophysical data interpreter's ability to evaluate and interpret subtle variations in the earth's geological and lithological structures.

SUMMARY OF THE INVENTION

In the present invention, a geophysical data set is obtained and the dynamic range of the seismic signals contained therein is compressed. The compressed seismic signals are plotted as seismic sections so as to enhance interpretation and evaluation of subtle stratigraphic geological and lithological features in the earth's subsurface as represented by small amplitude values in the seismic signals.

One embodiment of the present invention comprises nonlinearly compressing the seismic data by exponentiating each seismic signal to a selected power $\alpha$, where $\alpha < 1$. Preferably, the absolute value of each seismic signal is exponentiated to the selected power $\alpha$, and a product is then obtained of the exponentiated signal and the sign of its corresponding seismic signal to obtain a compressed signal. The compressed signals can then be plotted as black-and-white wiggle traces or with colors of the original amplitude values of the seismic signals overlaid thereon. Seismic displays produced from such compressed signals are better able to portray more of the usable dynamic range of the seismic data so that geophysical interpreters can more easily identify and interpret subtle variations in the earth's geological and lithological structures.

These and other benefits of the present invention are more completely described below with reference to figures in the included drawings.

DETAILED DESCRIPTION OF THE INVENTION

In order to better understand the present invention, the following introductory discussion is provided. Data of any type, and geophysical data in particular, have dynamic range. The dynamic range of geophysical data comprises a relative measure of the difference in value of the largest and smallest signals contained therein as set forth in Equation (1) below:

$$\text{dynamic range} = 20 \log_{10}(A_1/A_2) \tag{1}$$

where $A_1$ = largest value; and $A_2$ = smallest value.

Figure 1:
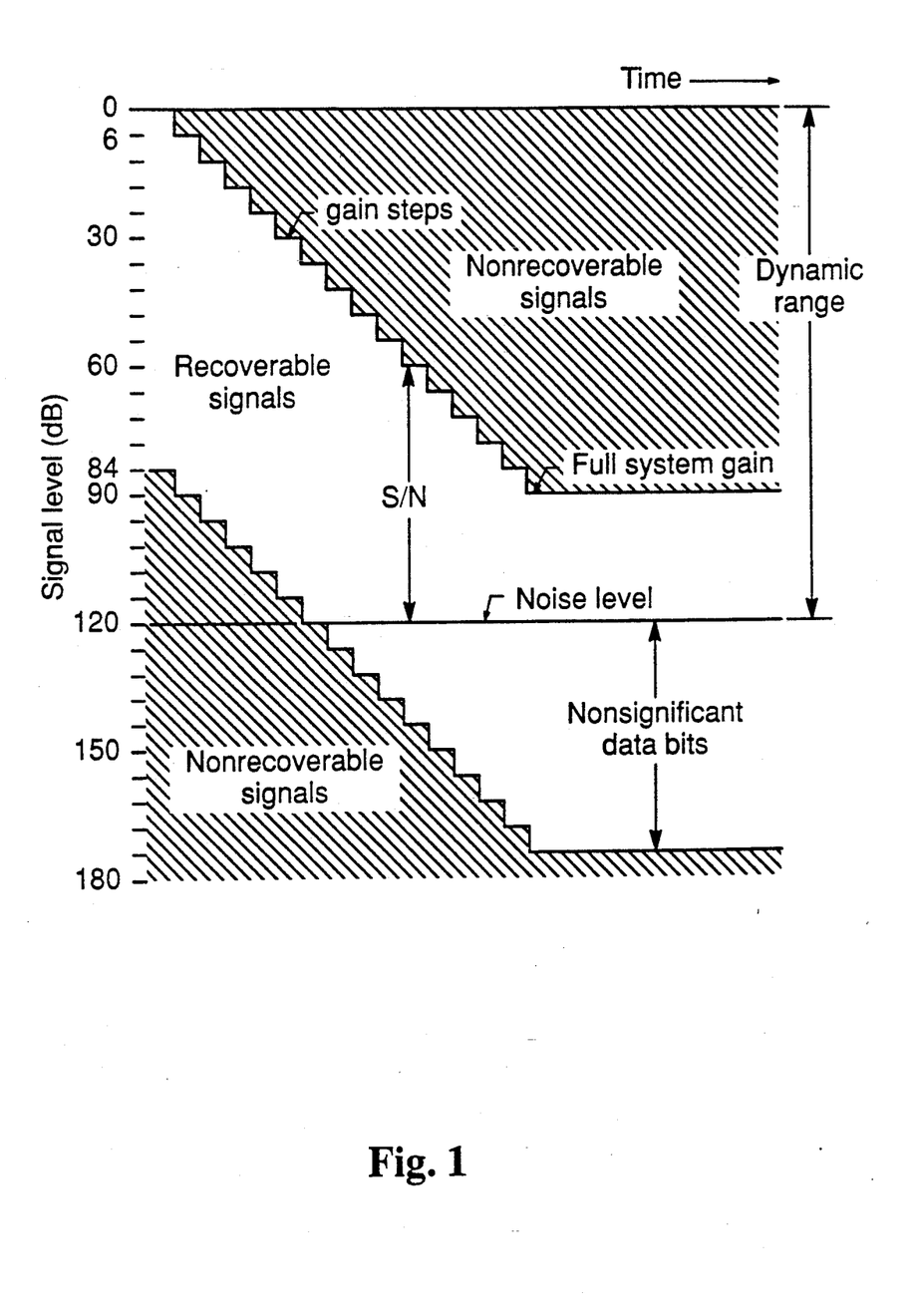
FIG. 1 is a graphical representation of dynamic range for seismic signals recorded using binary-gain recording.

Geophysical acquisition systems are capable of recording very large and very small amplitude signals and subsequently recovering them. The smallest recoverable signal is often taken to be the rms noise level of the system and hence the usable portion of dynamic range can be described as a ratio of the largest signal which can be recorded to rms noise (i.e., signal-to-noise (S/N) ratio) as depicted in FIG. 1. FIG. 1 provides a graphical representation of the dynamic range which can be obtained for a seismic signal recorded using a 14 bit mantissa and a binary-gain recording system. Since the amplitude of recorded seismic signals typically decrease, as a function of time, binary-gain recording amplifies the seismic signal at selected time increments. Consequently, signal amplitudes greater than expected for a given time can be too large to be recorded with a 14 bit recording system and as such this portion of the signal is nonrecoverable. Similarly, signal amplitudes smaller than expected for a given time can be too small to be recorded with the 14 bit recording system and as such this portion of the signal is also nonrecoverable. Both of these data losses are depicted in the cross-hatched portions of FIG. 1. Moreover, the concepts of the usable or recoverable portion of the dynamic range (i.e., S/N) is clearly depicted as well as that of nonsignificant data (i.e., data below the noise level).

Until the advent of digitization of seismic data, the dynamic range of recorded analog seismic signals generally matched the dynamic range limitations of seismic display techniques (i.e., about 12 db). As a result of improvements in systems for recording seismic data and the digitization of seismic data, whereby increases from 12 bits to upwards of 22 bits of recorded data can now be obtained, the dynamic range of seismic data has theoretically increased from about 12 db to as high as 132 db. While those skilled in the art will appreciate that the usable portion of such dynamic range can be much less than the theoretical dynamic range because of contamination of the data with noise, modern processing techniques have expanded the usable dynamic range over which signals (as opposed to noise) can be recovered. Typically, the usable dynamic range of currently acquired seismic data is at least 24 db.

Figure 2:
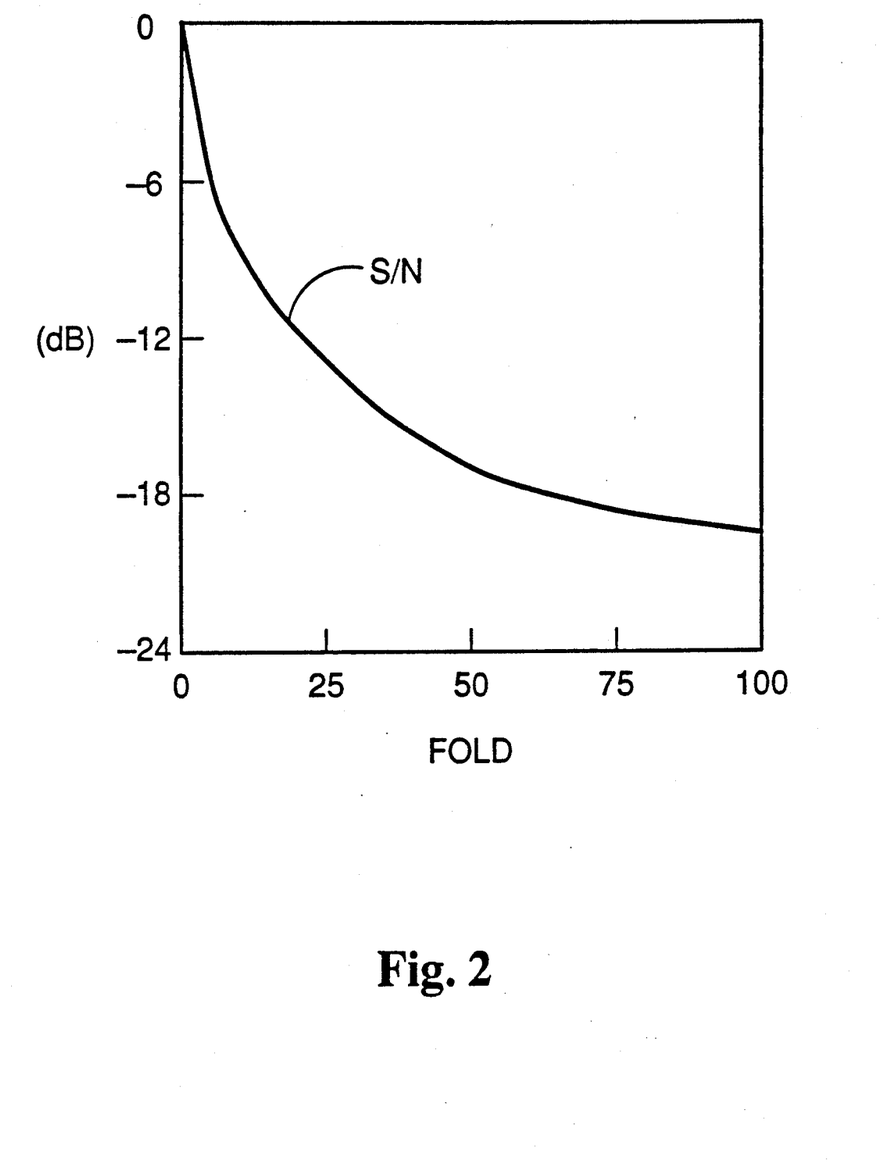
FIG. 2 is a graphical representation of the relationship between signal-to-noise (S/N) ratio and fold.

Additionally, the use of redundant recording of seismic signals from a common midpoint can theoretically improve the S/N ratio by a factor of $\sqrt{N}$, where N is the fold as shown in FIG. 2. This improvement factor is based on the assumption that the sum of the reflection signals from a common midpoint gather is reinforced and that random noise is cancelled. Because these assumptions do not strictly hold in practice, the S/N ratio improvement gained by stacking common midpoint gather signals is somewhat less than $\sqrt{N}$. Since the inception of common depth point collection and stacking of seismic data, the average fold has increased from approximately 24 to 60 with uses as high as 120 and higher.

Thus, increasing the usable portion of the dynamic range of seismic data can be and has been achieved by increasing the fold as well as improving acquisition hardware. Unfortunately, such increases have had only limited impact on the geophysical interpreter's ability to utilize the broader dynamic range of this data. This is so because the interpreter, the most important element in evaluating geophysical data, has generally been unable to perceive these increases in dynamic range because current techniques for visually portraying geophysical data are inherently incapable of conveying such information to the eye of the interpreter.

Current techniques for displaying geophysical data include paper plots (black-and-white as well as color) and computer generated CRT (cathode ray tube) displays. By way of example, geophysical CRT's typically have a display capability of 300-500 pixels/in. which translates into a theoretical resolution of approximately 0.003-0.002 inches. Unfortunately the resolution capability of the naked eye is at best of the order of approximately 0.01 inches. If one were to plot 12 bit geophysical data (thus representing variations from 0 up to ±2047) on a scale of 0.01 inch (e.g., 40 pixel display units)= ±2047 data units, each pixel could represent any one of approximately 100 units of the data. Consequently, if the largest value in the data set is assigned to the maximum display pixel value (i.e., 20) a value one tenth of the largest value in the data set would be assigned a pixel display value of 2. The difference in magnitude in these two display values represents 20 db of dynamic range. In fact, the smallest display value now represents only 0.005 inches. As such when the resolving power of the naked eye is included, the dynamic range ascertainable by the typical geophysicist can be reduced to the order of 12 to 18 db. Consequently, small amplitude values (greater than 12 to 18 db down from the largest amplitude values) in the geophysical data, representative of subtle stratigraphic features, may not be discernible to the geophysical interpreter.

By accepting the dynamic range limitations of current display techniques, a novel method has been developed whereby the dynamic range of geophysical data to be displayed can be compressed to more nearly match the dynamic range resolution limitations of current display techniques. Looking now to FIG. 3, a flow diagram of the present invention is provided. In particular, a set of geophysical data (e.g., seismic signals) are obtained at step 10. Preferably, the geophysical data are stacked seismic signals whereby the advantages of redundant signals can be employed to optimize the S/N ratio of the seismic signals at step 20. In fact, the seismic data can be stacked and migrated.

Figure 3:
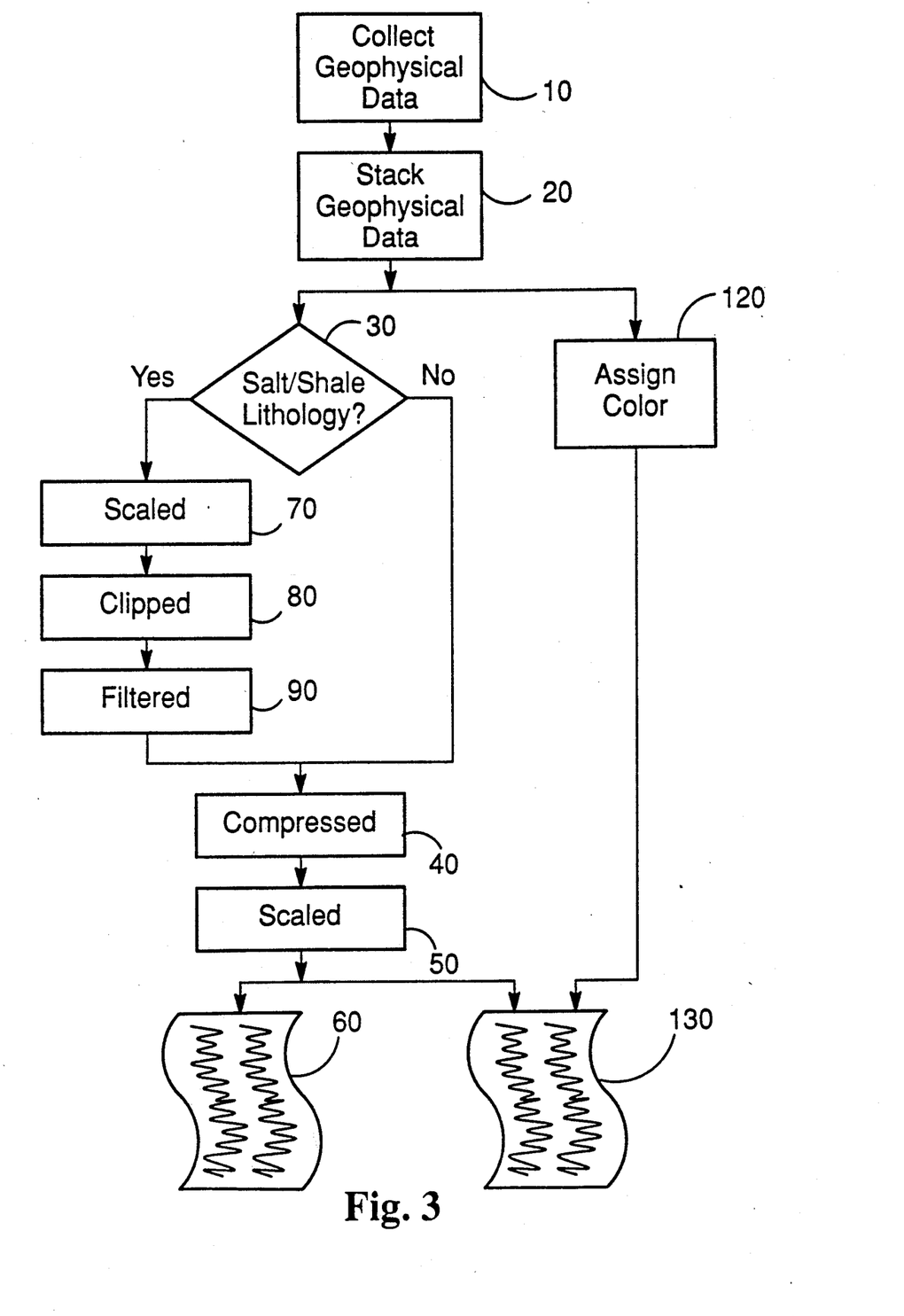
FIG. 3 is a flow diagram of the present invention.

At step 30, an initial assessment is made by a geophysical data interpreter as to whether or not salt domes or shale lithologies are believed to be present. As will be shown later, regardless of the path taken from decision block 30, compression of the dynamic range of the seismic data is essentially the same except for selected pre-processing steps related to the amplitude variations which can exist in the seismic data for salt domes or shale lithologies.

Proceeding first along the path of no salt or shale, the dynamic range of the geophysical data is compressed at step 40. The compression of the dynamic range is such that the amplitude of the smallest signal is increased nonlinearly relative to the amplitude of the largest signal in the geophysical data. Equation (2) below is exemplary of one method of compressing the dynamic range:

$$C(t) = SIGN(T(t)) * |T(t)|^\alpha \qquad (2)$$

where
$\alpha < 1$ and $\alpha \neq 0$
T(t) is the seismic signal;
C(t) is the compressed signal; and
SIGN (T(t))= ±SIGN of T(t).

By way of example, if the geophysical data comprise 12 bit data having a largest value of 1600 and a smallest value of 16 (i.e., 40 db of dynamic range) and a value of $\alpha = 0.5$ in Equation (2) is used to compress the dynamic range of the data, the largest value in the compressed data will be 40 and the smallest value will be 4 while the dynamic range will have been compressed from 40 db to 20 db.

Figure 4:
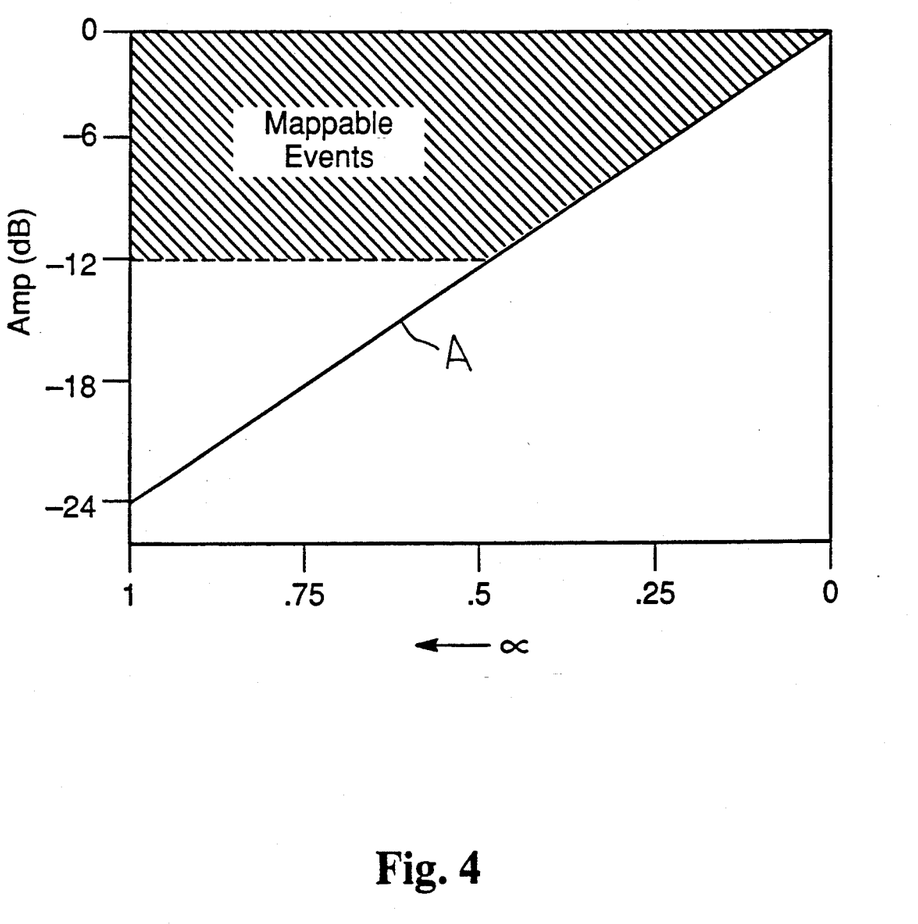
FIG. 4 is a graphical representation of the compression of the dynamic range of seismic data by exponentiating each seismic signal to a selected power $\alpha$, where $\alpha < 1$.

FIG. 4 portrays the effect of various values of $\alpha$ in compressing the dynamic range of the seismic data. In particular, the line labeled A shows the effect of selecting different values of $\alpha$ on compressing the dynamic range. For example, when an event having an amplitude of $-24$ db (at $\alpha = 1$) is exponentiated to a value of $\alpha = 0.5$ it will have an amplitude of $-12$ db relative to the largest amplitude. Additionally, the horizontal dashed line at $-12$ db is generally indicative of a geophysical interpreter's ability to visually perceive amplitude events having a value 12 db lower than the largest amplitude event on a conventional black-and-white wiggle trace display. Consequently, the cross-hatched area bounded by the $-12$ db line and line A can be thought of as representing mappable events. Alternative compressions of the dynamic range can include obtaining the logarithm (natural or base 10) or the reciprocal of the seismic signal.

At step 50, a generalized time-invariant amplitude scaler is applied to the compressed data whereby the maximum value of the compressed data is scaled so that it corresponds to the maximum display value of our previous example (i.e., 40 data units=250 display pixel units) and the minimum value of the compressed data is scaled proportionally (i.e., 4 data units=25 display pixel units). A display of the compressed data can be made at step 60. Such display can be either a paper plot or CRT display.

Figure 5A:
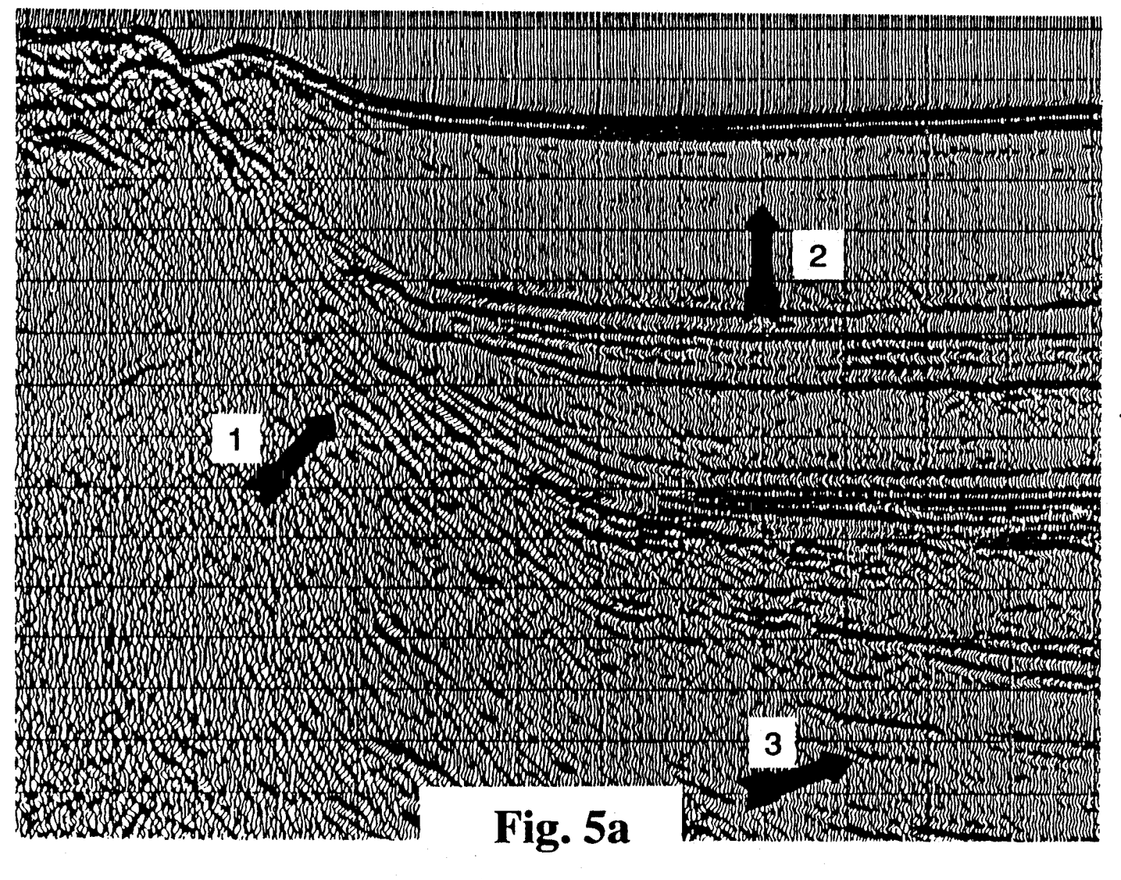
FIGS. 5(a) and 5(b) each represent a conventional seismic wiggle trace display before and after application of the present invention.
Figure 5B:
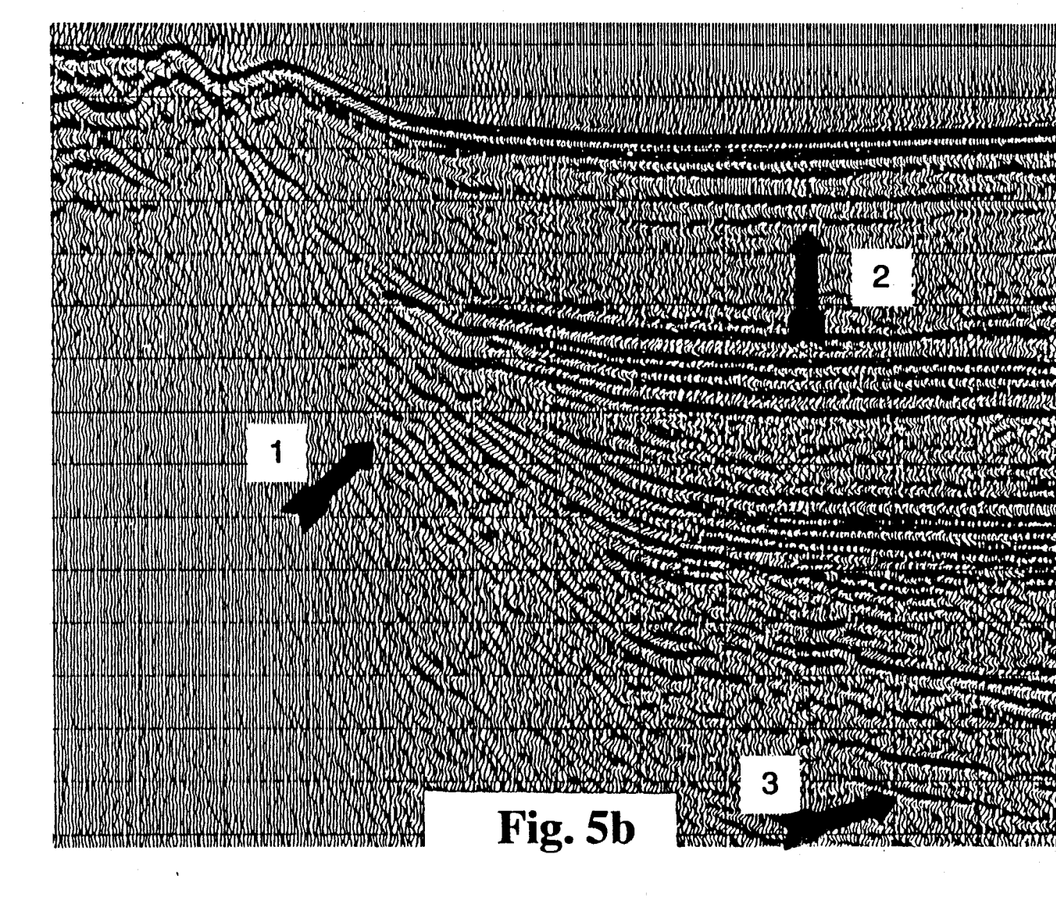

By comparing the stacked and migrated seismic data in FIGS. 5(a) and 5(b), one can immediately see a pronounced and dramatic effect of the compression of the dynamic range of the seismic data whereby subtle seismic events indicated by arrows numbered 2 and 3 in FIG. 5(a) are now more clearly discernible in FIG. 5(b).

If at decision point 30 it is determined that either salt domes or large shale lithologies are present, special pre-processing of the seismic data is required because such formations are typically low amplitude signal areas. Consequently, it is sensible to eliminate amplitudes below a selected value because they are likely to be noise corrupted. By way of example, FIG. 5a depicts a salt dome (in the vicinity of arrow number 1) in which the seismic data have undergone automatic gain control (AGC). The salt dome of FIG. 5a is filled with numerous apparent reflection events even though such salt dome formations are notoriously quiet. FIG. 5b depicts the same salt dome formation after processing in accordance with the present invention. However, the seismic data of FIG. 5b were first scaled at step 70 with a generalized time-invariant scaler so that the maximum data value is set equal to the maximum display value and lesser data values are scaled proportionally. The geophysical data are then clipped at step 80 whereby data values below a selected value are set equal to zero, and, finally, the geophysical data are spatially filtered at step 90 to remove spatially coherent noise in the geophysical data. Thereafter, the data are compressed, scaled and plotted as previously discussed at steps 40, 50 and 60, respectively.

The seismic data in FIG. 5(b) within the salt dome formation, in the vicinity of arrow number 3 can now be seen to be very quiet as one would reasonably expect. As now presented, the seismic data can more easily be interpreted to locate and identify the truncation of other formations against the salt dome as well as other subtle features.

The beneficial effects of dynamic range compression can be realized not only in black-and-white wiggle trace plots as previously discussed but also in color displays. Visually discernible increases in dynamic range can further be achieved with the use of colors. Such increases in dynamic range are related to the number of distinctly discernible colors employed. For example, if the strongest amplitude event in a seismic signal is assigned a first color and an event which has only 1/16 of the largest amplitude is assigned a second visually discernible color, such a plot would provide 24 db of dynamic range.

Figure 6A:
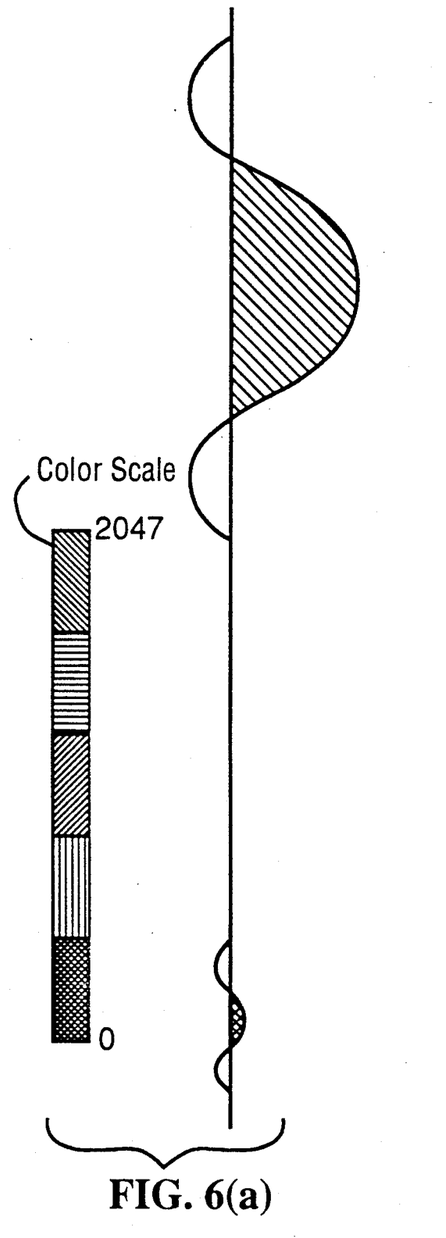
FIGS. 6(a) and 6(b) represent a color display of seismic data before and after application of the present invention, respectively.

However, typical color displays of seismic data comprise coloring either the positive or negative lobes of the signal as shown in FIG. 6(a) wherein different colors are represented by different cross hatching. Consequently, large amplitude events stand out because there is a large area of color, but smaller amplitude events are less noticeable because only a small area is filled in with its amplitude-related color. The net result of such color plots can be to have effectively the same dynamic range as black-and-white plots (i.e., 12-18 db).

Figure 6B:
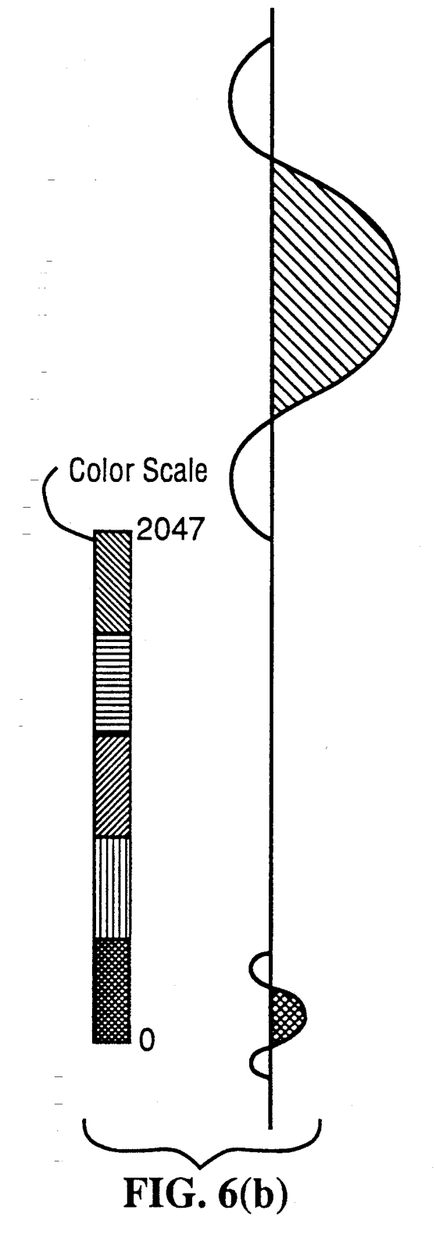

At step 100, of FIG. 3, amplitude values of the seismic data, before compression, are assigned distinct colors. At step 110 either the positive or negative lobes of the wiggle trace plots from step 60, are colored using colors determined from the corresponding original event amplitudes of the seismic data prior to compression as shown in FIG. 6(b). Consequently, FIG. 6(b) highlights low amplitude signals in the seismic data yet retains the true amplitude variations of the seismic data both of which greatly assist the geophysical interpreter in evaluating and interpreting subtle variations in the earth's geological and lithological structures.

Having thus described the present invention, it is to be appreciated that additions and modifications may be made thereto without departing from the invention as defined in the following claims.

What is claimed is:

1. A method for producing displays of geophysical data, to enhance the evaluation and interpretation of variations in geophysical data representing subtle changes in the earth's geological and lithological structures, comprising the steps of:
   (a) obtaining a set of geophysical data characterized by a dynamic range;
   (b) selecting a display technique characterized by a predetermined dynamic range that is less than said dynamic range of said data;
   (c) non linearly compressing the dynamic range of said geophysical data to approximate said dynamic range of said selected display technique;
   (d) scaling said compressed geophysical data by having the maximum of said geophysical data approximate the maximum intensity level of said selected display technique; and
   (e) producing a display of said non-linearly compressed geophysical data using said selected display technique.

2. The method of claim 1, wherein step (b) is performed by taking a nonlinear part of each element of said set of geophysical data.

3. The method of claim 2, wherein said nonlinear part is obtained by taking a root of each element.

4. The method of claim 2, wherein said fractional part is obtained by exponentiating each element by an exponent whose value is less than one and greater than zero.

5. The method of claim 4, wherein said geophysical data are exponentiated according to:

$$C(t) = SIGN(T(t)) * |T(t)|^\alpha$$

where T(t) is a seismic signal element comprising said set of geophysical data; SIGN (T(t)) is the ±signal of said seismic signal element T(t); α is said exponent; and |T(t)| is the absolute value of said seismic signal element.

6. A method of displaying geophysical data to highlight amplitude variations in seismic signals representing the earth's geological and lithological structures, comprising the steps of:
   (a) obtaining a set of geophysical data, wherein said geophysical data comprise a collection of seismic signals having varying amplitudes including a maximum amplitude and a minimum amplitude;
   (b) using said maximum amplitude and said minimum amplitude to determine the dynamic range of said data;
   (c) selecting a display technique characterized by a dynamic range that is less than said dynamic range of said data;
   (d) nonlinearly compressing the amplitudes of said seismic signals by an amount to have a dynamic range approximately equal to said dynamic range of said selected display technique; and
   (e) producing a display of said nonlinearly compressed seismic signals that is at least 12 dB down from said maximum amplitude of said seismic signals.

7. A method of geophysical exploration, comprising the steps of:
  (a) obtaining a set of geophysical data comprising a plurality of seismic signals having varying amplitudes and having a dynamic range;
  (b) selecting a display system having a dynamic range characteristic that is less than said dynamic range of said geophysical data;
  (c) linearly compressing said dynamic range of said geophysical data by nonlinearly compressing said amplitudes of the seismic signals comprising said geophysical data; and
  (d) scaling said compressed seismic signal amplitudes and displaying said amplitudes of said seismic signals to have the maximum amplitude of said compressed seismic signals approximate the largest displayed amplitude and to have the minimum amplitude of said compressed seismic signals at least 12 dB down from said largest displayed seismic signal amplitudes.

8. The method of claim 7, wherein the step of linearly compressing the dynamic range of the geophysical data comprises exponentiating the amplitude of each seismic signal to a power $\alpha$, where $\alpha$ is greater than zero and less than one.

9. The method of claim 7, wherein the step of linearly compressing a the dynamic range of the geophysical data comprises obtaining a logarithm of the amplitudes of each seismic signal.

10. The method of claim 8, wherein the step of linearly compressing the dynamic range of the geophysical data comprises the steps of:
  (a) obtaining the absolute value of the amplitude of each seismic signal;
  (b) exponentiating the absolute value of each seismic signal amplitude to said power $\alpha$; and
  (c) obtaining a product of the exponentiated absolute value of each seismic signal amplitude and the $+/-$ sign of each seismic signal.

11. The method of claim 10, wherein step (d) is performed by scaling said compressed geophysical data with a time invariant scaling factor.

12. A method of geophysical exploration, comprising steps of:
  (a) obtaining a set of geophysical data comprising a plurality of geophysical signals having varying amplitudes;
  (b) determining the dynamic range of said data;
  (c) selecting a display technique having a lower dynamic range;
  (d) exponentiating the geophysical data to a power such that the dynamic range of the exponentiated geophysical data approximates the dynamic range of said selected display technique;
  (e) producing a display of the exponentiated geophysical data; and
  (f) evaluating and interpreting variations in the displayed exponentiated geophysical data to identify subtle variations in the earth's geological and lithological structures.

* * * * *